Dec. 25, 1962  E. R. PIERCE  3,070,020
VARIABLE DISPLACEMENT PUMPING MECHANISM
Filed July 18, 1958  4 Sheets-Sheet 1

INVENTOR.
Earl R. Pierce
BY
ATTORNEY

Dec. 25, 1962 — E. R. PIERCE — 3,070,020
VARIABLE DISPLACEMENT PUMPING MECHANISM
Filed July 18, 1958 — 4 Sheets-Sheet 4

INVENTOR.
Earl R. Pierce
BY
L. D. Burch
ATTORNEY

United States Patent Office 3,070,020
Patented Dec. 25, 1962

3,070,020
VARIABLE DISPLACEMENT PUMPING MECHANISM
Earl R. Pierce, Bow, Wash., assignor to General Motors Corporation, Detroit, Mich., a corporation of Delaware
Filed July 18, 1958, Ser. No. 749,453
4 Claims. (Cl. 103—9)

This invention is a continuation-in-part of United States patent application Serial No. 504,527, now Patent Number 2,981,371 issued September 21, 1960, relating generally to hydraulic pumping mechanisms of the variable displacement type and more particularly to pumping mechanisms of the variable displacement type.

One of the principal objects of this invention is to provide a hydraulic pumping mechanism of the variable displacement type with an improved means for varying the pumping displacement of the mechanism in response to the output of the unit.

A second principal object of the invention is to provide a combined pumping mechanism comprising at least two companion variable displacement pumping units with improved and cooperating means for varying the displacement of each pumping unit in response to the output of one of said units and in substantially fixed ratio with respect to each other.

A preferred illustrative embodiment of the invention as herein shown and described has particular application to the lubrication system of an internal combustion engine of the so-called dry-sump type. In such engine lubricating systems, an engine-driven pump draws lubricating oil from a supply reservoir and pumps it under pressure to the engine parts to be lubricated and cooled thereby. The oil then drains into a "dry" sump from which a second engine-driven scavenging pump unit returns the oil to the reservoir. However, its use is not limited to applications of this particular nature and in its broader aspects is considered adaptable to variable displacement pumps generally.

In engine lubricating applications, the datum of oil required for proper lubrication is principally a function of engine speed. It is, therefore, desirable to regulate the discharge of the lubricant-supplying pump in accordance with engine demand, to limit the lubricating pressure and the power utilized by the lubricant pump, and to prevent excessive foaming of the oil which is a by-product of excessive lubricating pressure and sarvation of the pump at certain speeds. In hydraulic pumping mechanisms utilized in conjunction with a dry-sump engine, it is similarly desirable to regulate the output of the dry-sump-scavenging pump unit in accordance with engine demand since the scavenging unit must return the lubricant collecting in the sump to the reservoir. Since the oil delivered to the various parts of an internal combustion engine for lubrication and cooling becomes aerated with a resultant increase in volume, the dry-sump-scavenging pumping unit must necessarily be provided with a capacity substantially greater than the capacity of the pressure-supplying pumping unit at all engine speeds to insure the removal of the oil as it accumulates in the sump under all pump operating conditions.

Other principal objects of the invention are to provide a combined pumping mechanism for a dry-sump engine including two commonly driven variable displacement pumps of differing capacities with improved means for varying the displacement of each pump in accordance to their driven speed and the lubricating demands of the engine, such means adjusting the pumping capacity of each pump in a substantially fixed ratio with respect to the adjusted capacity of the other pump and having dampening means associated therewith capable of minimizing the displacement varying effect of pressure pulsations thereon, thereby preventing hunting of the displacement varying means.

The foregoing objects are obtained in the preferred illustrative embodiment of the invention by providing a hydraulic pumping mechanism featuring, in combination, a plurality of variable displacement vane-type pumps arranged in juxtaposition within a common casing, each of the pumps including a rotor body, a cylinder barrel movable transversely of the rotor to vary the displacement of the pump, a plurality of vanes reciprocably mounted in the rotor body and working against the cylinder barrel and dividing each pump unit into a plurality of expansible pumping compartments, a shaft common to the various pump units and adapted to drive the several rotors, resilient means normally biasing the cylinder or barrel toward its maximum displacement position, expansible chamber means responsive to the discharge pressure of one of the pumps for adjusting the eccentricity of each of said barrels with respect to the axis of the rotor body in opposition to the resilient biasing means thereby varying the pumping capacity of each unit in a fixed ratio with respect to the other units and in accordance with the speed of the driving shaft and the lubricant or fluid demands of the associated engine or pressure system, and means associated with the expansible chamber means for damping the discharge pressure response thereof to prevent cyclic hunting or variation in the discharge pressure.

The foregoing and other objects, features and advantages of the invention will be more thoroughly understood from a detailed description of the illustrative embodiment thereof as shown by the accompanying drawings, in which.

Figure 1:
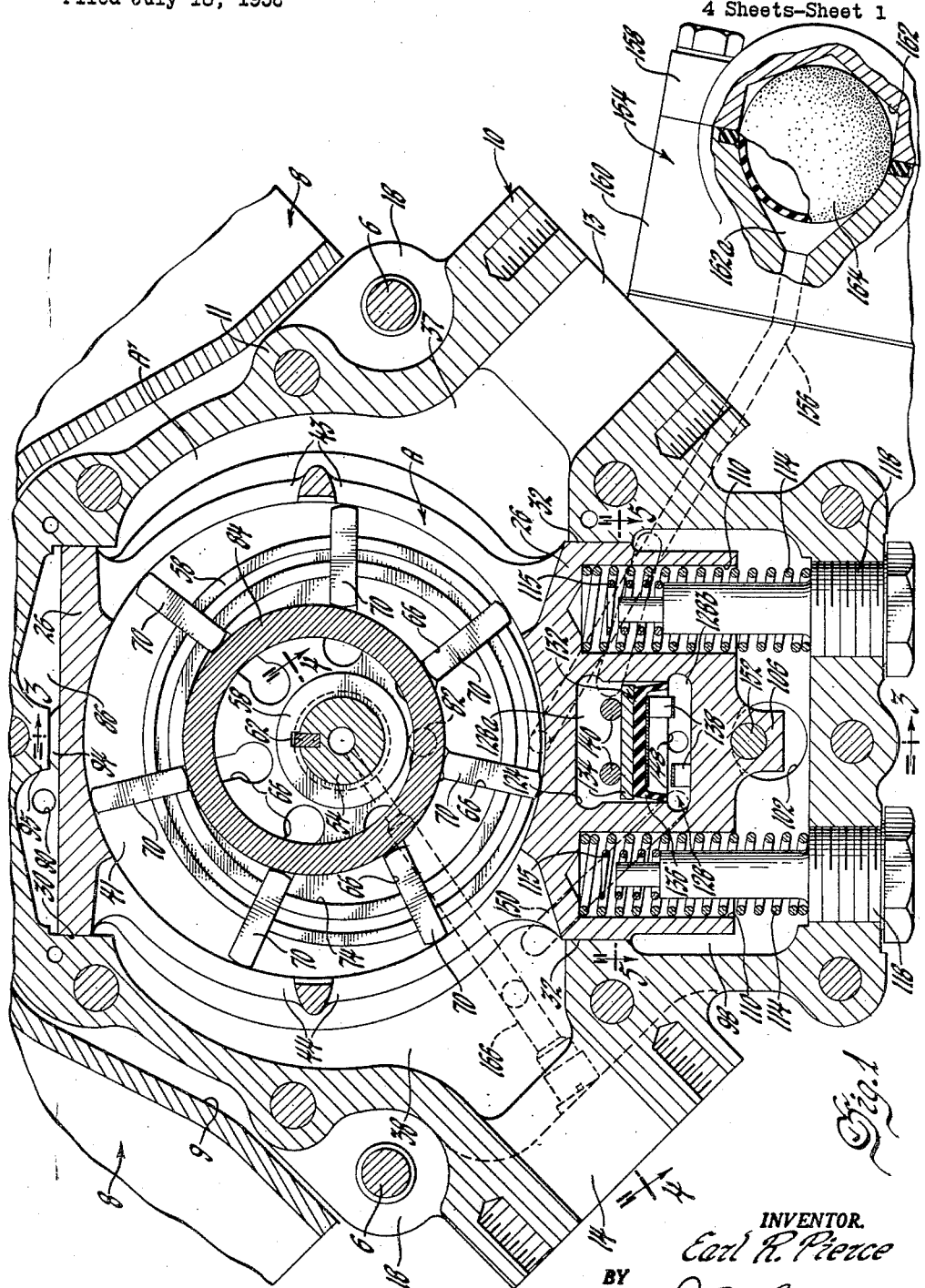
FIGURE 1 is a transverse sectional view taken substantially on the line 1—1 of FIGURE 3 with additional portions broken away and in section to show the details of the lubricant-supplying pump of a combined pump unit constructed in accordance with the invention and mounted on a dry sump engine.
Figure 2:
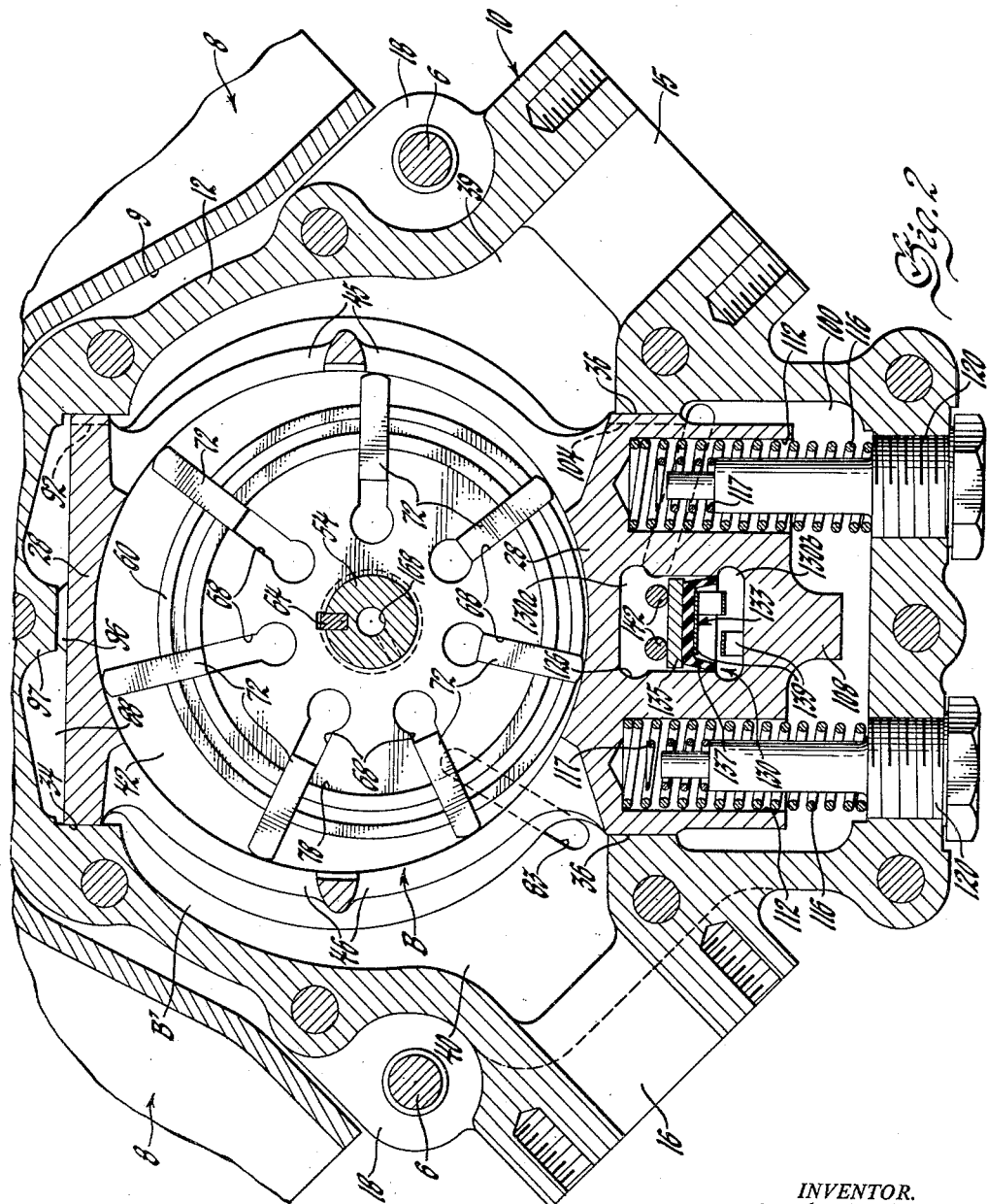
FIGURE 2 is a sectional view similar to FIGURE 1 taken substantially on the line 2—2 of FIGURE 3 to show the details of the sump scavenging pump.
Figure 3:
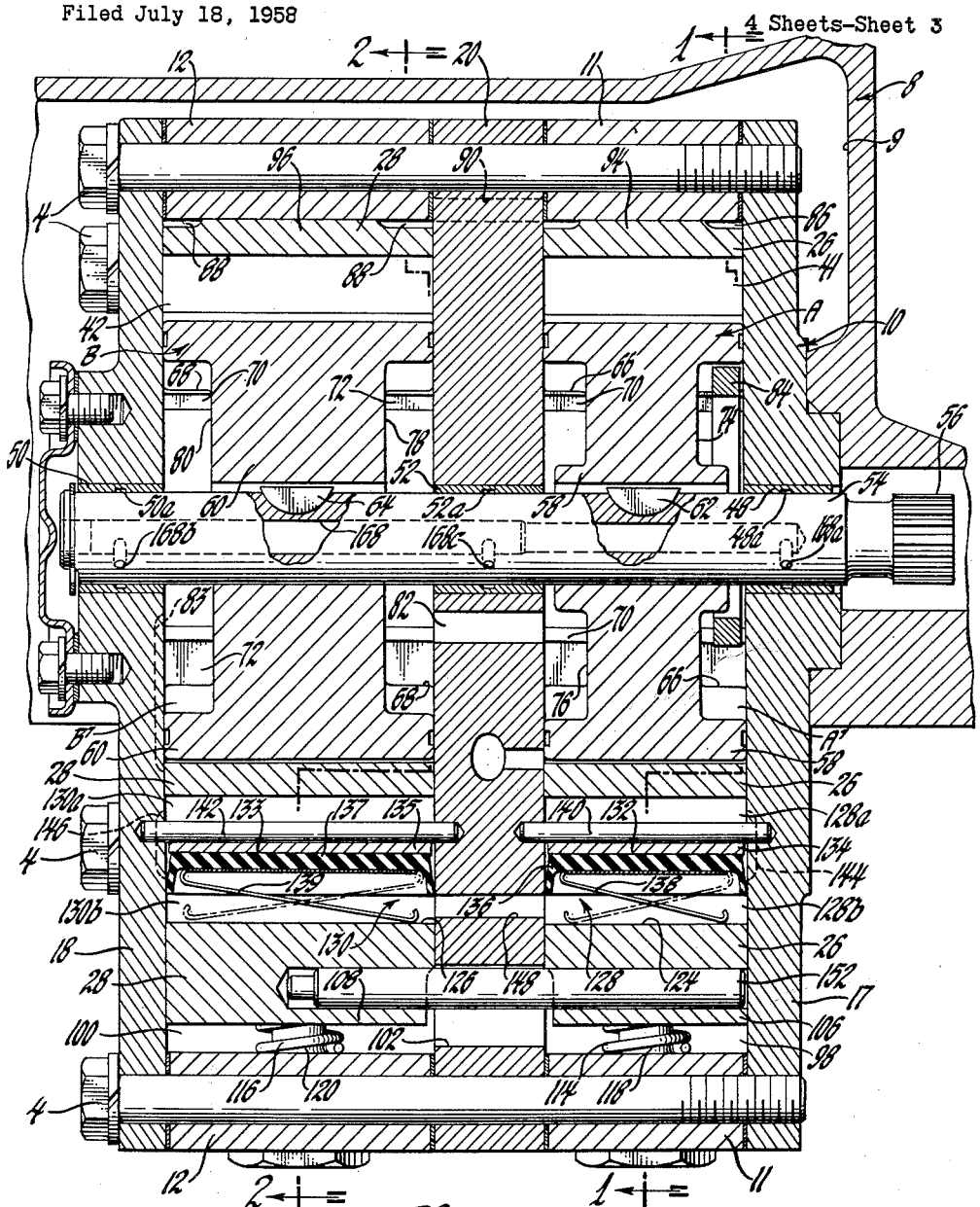
FIGURE 3 is a vertical sectional view taken substantially on the line 3—3 of FIGURE 1.
Figure 4:
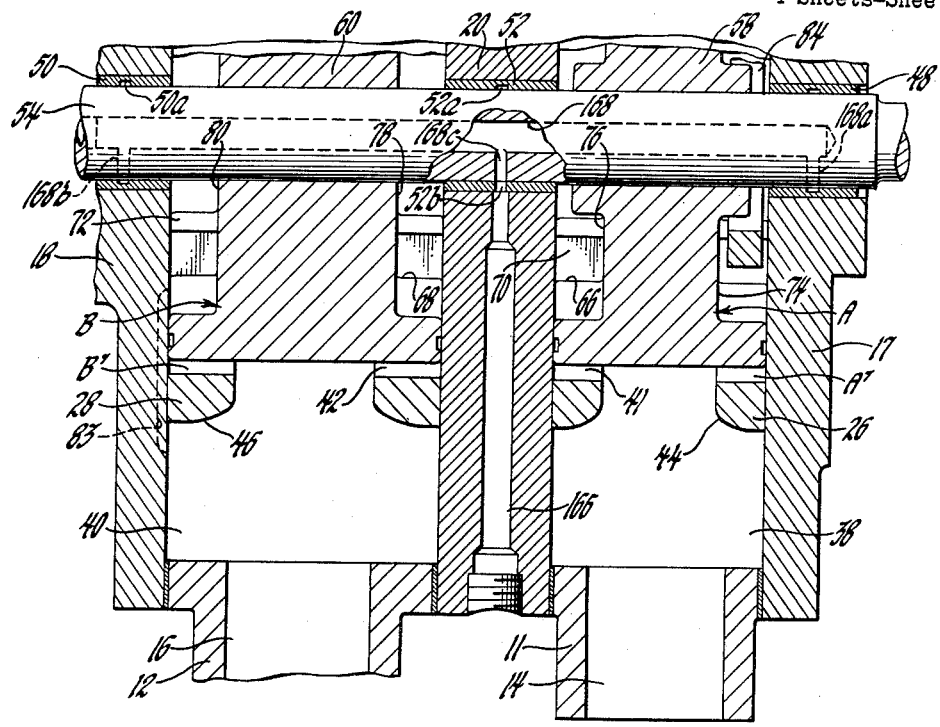
FIGURE 4 is a sectional view taken substantially on the line 4—4 of FIGURE 1.
Figure 5:
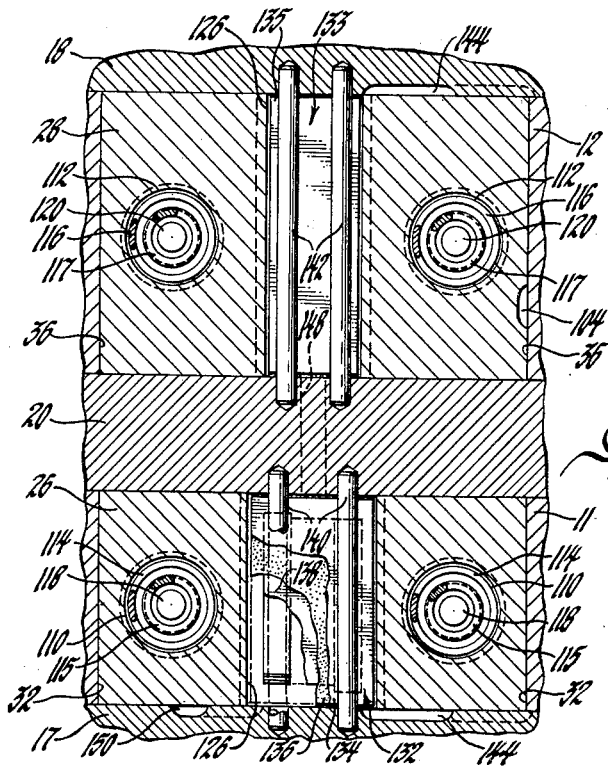
FIGURE 5 is a sectional view taken substantially on the line 5—5 of FIGURE 1 with certain portions thereof broken away and in section to show certain additional structural details.

Referring more particularly to FIGURES 1, 2 and 3 of the drawings, the combined pump mechanism includes a casing 10 which is secured by two bolts 6 to the frame or crankcase member of a dry-sump type internal combustion engine, such engine member being partially shown at 8 and having a recess 9 therein for receiving and mounting the pump mechanism. As best seen in FIGURE 3, the casing 10 comprises two body members 11 and 12, end cover plates 17 and 18, and a center partition plate 20. The several elements of the casing 10 are secured together in fluid sealing relation by a plurality of stud bolts 4 and define two pump chambers A' and B' therein which are aligned in juxtaposition to each other. The body members 11 and 12 are each provided with inlet openings 13 and 15 and outlet openings 14 and 16 for the chambers A' and B', respectively, The inlets 13 and 15 are connectable to the lubricant reservoir and to the dry sump of the engine, respectively, and the outlets 14 and 16 are connectable to the pressure-lubricant supply system of the engine and to the lubricant reservoir, respectively.

Two variable displacement vane-type pumping units A and B are mounted in the chambers A' and B', respectively. These pumping units serve as a lubricant supply pump and as a dry sump scavenging pump, respectively. The pumps A and B each include a cylinder or barrel member, 26 and 28, respectively. The barrel members 26 and 28 are reciprocably mounted in the casing as guided by crosshead portions 30, 32 and 34, 36 of the body members 11 and 12, respectively, and partition the pump mounting chambers A' and B' into inlet chambers 37 and 39, discharge outlet chambers 38 and 40, and cylindrical pump chambers 41 and 42 for the pumping units A and B, respectively. The members 26 and 28 are circumferentially slotted as indicated at 43, 45 and at 44, 46 to provide arcuate inlet and outlet ports connecting the cylindrical pump chambers 41 and 42 to the inlet and outlet chambers 37, 39 and 38, 40 of their respective pumps.

The end plates 17 and 18 and the partition plates 20 are coaxially perforated and as indicated at 48, 50 and 52, respectively, journal a drive shaft 54 common to both of the pump units A and B. The drive shaft 54 is externally splined at 56 and is thereby drivingly connectable to the accessory driving system of the engine. Cylindrical rotors 58 and 60 are drivingly keyed at 62 and 64 to the shaft 54 within the pump chambers 41 and 42, respectively. The axially disposed faces on the peripheral portions of the rotors 58 and 60 are in rotative sealing engagement with the mating chamber-defining surfaces of the end and partition plates. The rotors 58 and 60 are each provided with a plurality of longitudinally and radially extending slots 66 and 68 which reciprocably mount blades or vanes 70 and 72, respectively. These vanes are normally caused to reciprocate in sealing engagement with the several surfaces defining the pump chambers 41 and 42, respectively, thereby dividing the chambers 41 and 42 into a plurality of expansible pumping chambers. The radially inner ends of the slots 66 and 68 terminate in drilled ports which extend longitudinally of the rotors and intersect counterbores 74, 76 and 78, 80 formed in and opening to the opposite end of the rotors 58 and 60, respectively.

The several recesses or chambers formed by the counterbores 74, 76, 78 and 80 are interconnected by a drilled passage 82 extending through the partition plate 20 and by the plurality of drilled passages terminating the radially inner ends of the slots 66 and 68. The end plate 18 is also provided with a groove 83 which faces the pump chamber B' and interconnects the discharge outlet chamber 40 of pump B with the counterbored recess 80 of the rotor 60. The relatively low discharge pressure of the pump B, thus supplied to the recesses 74, 76, 78 and 80, is applied therefrom to the radially inner ends of the vanes 70 and 72 of both pumping units and serves to maintain the several vanes radially outwardly in pumping and sealing engagement with their respective cylinder or barrel members 26 and 28. To insure proper priming of pump A when the engine is started, a ring 84 is also mounted in the recess 74 and engages the inner ends of the vanes 70 thereby positively maintaining the vanes 70 in pumping relation with the inner surface of the barrel member 26 as the rotor 58 is turned by the driving shaft 54.

The upper portions of the members 26 and 28 define expansible chambers 86 and 88 with the upper immediately adjacent portions of the casing. These expansible chambers are interconnected to each other by a drilled passage 90 extending through the partition plate 20 and are connected to the inlet chamber 39 of the pump B through a restricted passage intermediate the crosshead surface 30 of the casing member 12 adjacent the inlet chamber 39 and a groove 92 formed in the barrel member 28. Bosses 94 and 96 extending longitudinally of the members 26 and 28, respectively, and cooperating bosses 95 and 97 formed internally of casing members 11 and 12, also respectively, limit upward displacement-increasing movement of the cylinder members and thereby the minimum clearance volume of the expansible chambers 86 and 88, respectively.

The lower portions of the members 26 and 28 similarly cooperate with the adjacent lower portions of the casing to define expansible chambers 98 and 100, which chambers are interconnected to each other by a port 102 extending through the partition plate 20 and are connected to the inlet chamber of pump B through a restricted passage intermediate the crosshead surface 34 of casing member 12 adjacent the inlet chamber 39 and a groove 104 formed in the member 28. The downward displacement decreasing movement of the cylinder members 26 and 28 is limited by casing abutting bosses 106 and 108 which are formed on the members 26 and 28, respectively.

The barrel members 26 and 28 are each provided with two parallel bores 110 and 112, respectively, opening toward the lower inner surfaces of the casing members 11 and 12. These bores seat and serve as external guides for the upper ends of helical springs 114 and 116. The springs 114 and 116 are compressively interposed between the barrel members 26 and 28 and spring-seating shoulders provided therefor on adjustable spring seat members 118 and 120 which are threadably mounted in the body members 11 and 12, respectively. The springs 114 and 116 thus normally bias the members 26 and 28 toward their upper maximum displacement positions shown in FIGURES 1–3. A reduced diameter portion of each of the members 118 and 120 extends longitudinally from the spring seating shoulders and forms an internal spring guide spacedly embraced by the springs 114 and 115 and their respective mounting bores 110 and 112.

Adjacent their upper ends, the members 118 and 120 are each provided with a second reduced diameter portion forming shoulders seating a second set of helical springs 115 and 117, respectively. The springs 115 and 117 are not normally in biasing engagement with the closed spring seating ends of bores 110 and 112. However, upon a predetermined movement of the cylinder members 26 and 28 from their maximum displacement positions shown in FIGURES 1–3 to intermediate displacement positions, the springs 115 and 117 are caused to engage the spring seating ends of the bores 110 and 112. Any further displacement reducing movement of the cylinder members is necessarily effected against the combined biasing action of springs 114, 115 and 116, 117 for each pump, respectively, until the bosses 106 and 108 abut the inner bottom surfaces of the casing members 11 and 12, respectively.

The lower portions of members 26 and 28 are also provided with openings 124 and 126, respectively, which extend therethrough intermediate their spring seating bores and cooperate with cover members 17 and 18 and the partition member 20 to form chambers 128 and 130. Pistons 132 and 133 divide each of the chambers 128 and 130 into two expansible chambers, 128a and 128b and 130a and 130b, respectively. The pistons 132 and 133 each include an upper backing plate 134 and 135 and a rectangular cup-shaped seal member 136 and 137, respectively; the seal members 136 and 137 resiliently and sealingly engaging the chamber-defining side walls of the several casing and cylinder members. As in the illustrative embodiment, sheet metal spring members 138 and 139 may be resiliently interposed between the pistons 132 and 133 in the chambers 128b and 130b. The spring members 138 and 139 each include a rectangular portion engaging the bottom base portions of the cup-shaped seal members 136 and 137 and have leaf spring legs depending therefrom to resiliently engage the opposing surfaces of the cylinder members 26 and 28, respectively. The leaf spring members 138 and 139 coact with fluid pressure supplied to the chambers 128b and 130b to bias the pistons 132 and 133 into abutment with limit pins 140 and 142 which extend through the chambers 128 and 130, respectively, between mounting bores formed in and opening on the oppositely disposed surfaces of the cover and partition plates. The pistons are thus maintained stationary relative to the casing but reciprocate relative to the cylinder members 26 and 28 due to their pressure-responsive movement.

The expansible chambers 128a and 130a above the pistons 132 and 133 are connected by groove-formed passages 144 and 146 in the end plates 17 and 18, respectively, to the interconnected expansible chambers 98 and 100 and therethrough to the inlet chamber 39 of the pump B. The lower expansible chambers 128b and 130b are interconnected by a single drilled passage 148 extending through the partition plate 20 and the chamber 128b is connected to the discharge chamber 38 of the pump A through a groove 150 formed in the end plate 17. The pressurized discharge of pump A as thus applied to the chambers 128b and 130b tends to reciprocate each of the members 26 and 28 in opposition to the springs 114 and 116 in proportion to the pressure differential existing between the discharge pressure of pump A and the suction pressure of pump B as applied to the chambers 128a and 130a. The members 26 and 28 are thus shifted to vary the eccentricity of the pumping chambers 41 and 42 with respect to the common axis of the rotors 58 and 60 of the driving shaft 54.

In the illustrative embodiment of the invention the rates of springs 114 and 116 and the reaction surfaces of the pistons 132 and 133 and of the chambers 128 and 130 are preferably equal so that the application of the pressurized fluid from pump A results in the same degree of reciprocation for both members 26 and 28 thereby tending to maintain the displacement ratio between the pressure pump and the sump scavenging pump in a predetermined and substantially fixed ratio. To further insure maintenance of the displacement ratio between the two pumps, the cylinder barrels may be interconnected by a pin extending therebetween through the port opening 102 in the partition plate as indicated at 152, the pin being inserted in alignable bores extending through or into the limit bosses 106 and 108 of the cylinder barrel members 26 and 28. However, it will be obvious that for other applications it may be desirable to omit the pin 152 and by proper selection of the cylinder biasing spring rates and of the effective pressure-responsive surfaces of the displacement regulating means to vary the displacement of one pump as an increasing or decreasing function relative to the displacement of the other pump.

The springs 114 and 116 are normally prestressed by threadable adjustment of the spring seat members 118 and 120, respectively, to provide and maintain a minimum safe engine lubricating pressure at the outlet of pump A at a speed of the engine-driven shaft 54 corresponding to the engine idle speed. When this minimum pressure has been achieved in the outlet chamber 38, its application to the pressure-responsive displacement regulating means shifts the cylinder members downwardly until a minimum pressure, idle-speed equilibrium condition is effected between the biasing action of the springs 114 and 116 and the fluid pressure applied to the effective areas defining the expansible chambers 128b and 130b. It should be noted that the lubricating system of an internal combustion engine may be represented as a variable orifice, increasing only slightly in effective size with engine speed, such increasing characteristic being due primarily to the increased centrifuging of lubricant from the rotating parts. Hence, when the speed of the engine and therefore of the shaft 54 increases, an increase in the discharge pressure of pump A results and effects further shifting of the cylinder barrels 26 and 28 until a new equilibrium condition is obtained between the biasing action of the cylinder biasing springs and the pressure-responsive displacement regulating means.

The deflection rates of the springs 114 and 116 are preferably so selected that their progressive deflection between the positions shown in FIGURES 1 and 2 and second positions wherein the springs 115 and 117 initially engage the closed ends of the spring-seating bores 110 and 112 provides progressively increasing discharge pressures for the pump A throughout the normal speed range of the engine. Should it be desired to operate the engine above its normal rated speed, the additional biasing action provided by the buffer springs 115 and 117 serves to increase the pressure-speed characteristic or rate of pump A to provide for the additional cooling and lubricating demands under such higher speed engine-operating conditions. While the combined pump mechanism thus supplies increased lubricant pressure and flow with increased engine speed, it should be noted that for any given speed of the engine-driven shaft 54, the displacement of pump A is adjusted by the pressure-responsive regulating means so as to provide a substantially constant discharge pressure for the pump A and hence in the quantity of lubricant supplied to the engine. With or without the connection of the pin 152, a corresponding adjustment is made in the proportional displacement of the pump A to properly scavenge the oil thus supplied.

It will be noted that the portion of the pumping-chamber-defining surfaces of the cylinder members 26 and 28 between the inlet and outlet ports will alternately be subjected to the inlet and outlet pressures of their respective pumps. Such pressure variations act on these surfaces and tend to agitate the cylinders 26 and 28 with consequential cyclic variations in displacement and thereby in the discharge pressures of pumps A and B. Due to the substantially greater pressure differentials of pump A, the pressure variations imposed on this surface portion of member 26 will be substantially greater than those imposed on the corresponding surface portion of member 28. Such surfaces will also be subjected to any increase in pressuer generated in the lubricant entrapped between adjacent vanes as they pass through the zone defined between the inlet and outlet ports of the pumps. In accordance with one aspect of the invention this tendency to hunt, with the resultant generation of cyclic pressure pulses, is damped by the restricted flow of fluid to and from the expansible chambers 86 and 88 and 98 and 100.

To further dampen this tendency in the illustrative embodiment, a surge accumulator 154 is connected to the pumping chamber 41 intermediate the inlet and outlet ports 43 and 44 through a passage 156 in the partition plate. The surge accumulator 154 includes two housing members 158 and 160 which are secured to and sealed with respect to the partition plate 20. The housing members 158 and 160 define a chamber 162 therebetween which is connected to the partition passage 156. A resilient hollow ball 164 is mounted on the chamber 162 and sealingly engages the chamber defining side walls of the housing members 158 and 160 to define a secondary chamber 162a therein at the passage connected end of the chamber 162. The ball 164 may be of any suitable resilient material such as neoprene. Thus, any relative high pressure pulsations occurring between adjacent vanes 70 as they pass through the zone intermediate the inlet and outlet ports of pump A are absorbed by the ball accumulator 154 thereby minimizing or damping their effect on the cylinder barrels.

The shaft journal or bearings 48, 50 and 52 are lubricated in part by the scavenging pump discharge which is supplied to the counterbore chambers 74, 76, 78 and 80. However, to insure adequate lubrication of these bearings, a passage 166 in the partition plate connects the outlet chamber 40 of the scavenging pump to a radial port 52b and a groove 52a in the partition bearing 52 and therethrough to a radial branch 168c of a passage 168 which extends axially of the shaft 54. The lubricant supply passage 168 is similarly connected to lubricant supply grooves 48a and 50a in the bearings 48 and 50 through radial branch passages indicated at 168a and 168b.

From the foregoing description, the application of the illustrative embodiment of the invention as a combined lubrication supply and scavenging pump to a dry sump engine will undoubtedly be apparent to those skilled in the art. However, in the interest of clarity and completeness the operation of the described embodiment in such an application is briefly detailed below.

Assuming the engine to which the pumping mechanism is applied to be in a shutdown condition, the cylinder members 26 and 28 will be biased by the springs 114 and 116 to their maximum displacement positions, the bosses 94 and 96 being in abutment with limit bosses 96 and 97 of the casing body members 11 and 12, respectively. The vanes 72 of pump B will normally not be in working engagement with the inner surface of the cylinder 28 during the initial portion of the engine-starting period due to the absence of any pressure in the discharge chamber 40 of the pump B. As a consequence, pump B will be substantially unloaded during the initial engine starting period, at least until the vanes 72 have been carried outwardly into such engagement by centrifugal action. However, as indicated above, the ring 84 maintains the vanes 70 of pump A in pumping contact with the inner surface of the member 26. Therefore, a pump A supplies lubricant to the various engine parts to be lubricated simultaneously with rotation of the engine to effect engine starting. Upon centrifuging of the vanes 70 of the scavenging pump B into pumping relation with the cylinder member 28, the discharge of the scavenging pump B coacts with centrifugal force to maintain the vanes of both pumps in pumping engagement with their respective cylinder members. It will thus be seen that this construction results in the sequential loading of pumps A and B during the initial engine starting period thereby substantially reducing or distributing the impact or shock loads that would otherwise be imposed on the shaft 54 and the associated engine drive.

As indicated above, the springs 114 and 116 are normally prestressed to maintain the barrel members 26 and 28 in their maximum displacement positions at normal engine idle speed until the lubricant supply pressure in chamber 38 reaches the desired minimum safe operating level whereupon the cylinders 26 and 28 are shifted to equilibrium positions wherein the discharge of pump A is maintained at substantially such minimum level.

As the engine speed and therefore the speeds of the shaft-driven rotors 58 and 60 are increased above engine idle, the resultant increasing discharge pressure of pump A is applied to chambers 128b and 130b and causes the cylinder members 26 and 28 to move in further opposition to the biasing springs, reducing the eccentricity of the pumping chambers relative to the common axis of the shaft and rotors with consequential reduction of the displacement or pumping capacity of each pump, until a new condition of equilibrium is achieved between a higher pump A discharge pressure and the spring pressures reacting between the piston, the casing and the barrel members. Any further increase in engine speed produces a still further shifting of the barrel members until equilibrium is once again achieved. Similarly, upon reductions of engine speed and therefore in the discharge pressure of pump A, an increase in pump displacement is effected until equilibrium conditions are once again achieved.

It will thus be seen that use of the discharge pressure of pump A regulates the eccentricity of the barrel members 26 and 28 and thereby the pumping capacities of pumps A and B to provide the desired lubricating supply and necessary scavenging of the dry sump for any given engine speed, the predetermined required or nominal ratio of volumetric discharge between the scavenging and perssure pumps being maintained throughout the operational speed range of the engine. This is a highly desirable result in that it prevents extreme conditions in which starvation of the scavenging pump or flooding of the sump might occur and serves to minimize the aeration to foaming of the oil being returned to the reservoir.

While the foregoing description and figures have been confined to one embodiment, it will be apparent to those skilled in the art that, in addition to those modifications suggested above, numerous other modifications might be made therein without departing from the spirit and scope of the invention as defined in the following claims.

I claim:
1. A combined pumping mechanism comprising a casing having a plurality of chambers formed therein, a variable displacement rotary pump mounted in each of said pumping chambers, said pumps each including a rotor, a cylinder barrel mounted in each of said casing chambers and defining a pumping chamber therein movable to vary the pumping displacement of its respective pump, said casing and cylinder barrels defining an inlet passage and an outlet passage for each of said pumps, the rotor and barrel of each pump cooperating to define a plurality of variable displacement pumping compartments sequentially connectable to the inlet and outlet passages of their respective pumps, means for rotatably driving said rotors, a resilient means associated with and normally biasing each of said barrels in an increasing displacement direction, said casing and each of said cylinder barrels further defining a plurality of primary expansible chamber means therebetween, each of said primary expansible chamber means being operable in response to pressurized fluid supplied thereto to adjust the eccentricity of its associated cylinder barrel with respect to the axis of the rotor in opposition to said biasing means, first passage means interconnecting each of said primary expansible chamber means to the outlet passage of the same one of said pumps thereby rendering said primary expansible chamber means responsive to the discharge pressure of said same one pump to vary the relative pumping displacement of each of said pumps with respect to the other of said pumps in accordance with the pressurized fluid demand on said same one pump, said casing and each of said cylinder barrels further defining a plurality of secondary expansible chamber means therebetween, each of said secondary expansible chamber means being operable to retard movement of its associated cylinder barrel by said biasing means and said primary expansible chamber means and including second restricted passage means connecting said secondary expansible chamber means to the inlet passage of one of said pumps, and surge means for accommodating and damping pressure pulsations applied thereto, said surge means being connected to the pumping chamber of said same one pump intermediate its inlet and outlet passages and sequentially to the pumping compartments therein passing intermediate said outlet and inlet passages thereby minimizing the displacement varying oscillatory movement of the barrel of said pump due to the pressure pulsations otherwise applied thereto by the sequential connection of the several compartments to first the outlet passage and then to the inlet passage of said same one pump.

2. A variable displacement rotary pump comprising a rotor, means defining a cylindrical pump chamber spacedly embracing said rotor and including a member mounted for movement varying the eccentricity of the pump chamber with respect to the rotor axis between maximum and minimum displacement positions, said cylindrical chamber having inlet and outlet passages opening thereon, said rotor and the chamber-defining surfaces of said means cooperating to divide said pump chamber into a plurality of expansible pumping compartments, means for rotatably driving said rotor to sequentially connect said pumping compartments to said inlet and outlet passages, resilient means biasing said member toward its maximum displacement position, fluid pressure means operable in response to the fluid pressure supplied thereto to shift said member toward its minimum displacement position in opposition to the resilient biasing means, passage means interconnecting said fluid pressure means to said outlet passage thereby adjusting the eccentricity of said pump chamber with respect to the axis of its rotor and regulating the volumetric pumping capacity of said pump in accordance with the pressurized fluid supplied by said pump, damping means associated with said member and operable to damp the pressure responsive movement thereof by said fluid pressure responsive means thereby minimizing the displacement varying effect of pressure pulsations in the fluid supplied by said pump as applied to said fluid pressure responsive means, said damping means including an expansible chamber defined thereby and a restricted passage connecting said expansible chamber to the inlet passage of said pump, and surge means for accommodating and damping pressure pulsations applied thereto, said surge means comprising a closed chamber having a passage connected to said pumping chamber intermediate said inlet and outlet passages and sequentially connectable to the several pumping compartments in their passing intermediate said outlet and inlet passages thereby minimizing the displacement varying oscillatory movement of said member due to the pressure pulsations otherwise applied thereto by the sequential connection of the compartments to first the outlet and then the inlet passages.

3. In a variable displacement rotary pump, a rotor, means defining a pump chamber embracing said rotor and having inlet and outlet passages opening thereon, said rotor and the chamber-defining surfaces of said means cooperating to divide said pump chamber into a plurality of expansible pumping compartments, means for rotatably driving said rotor to sequentially connect said pumping compartments to said inlet and outlet passages, a member mounted for movement varying the displacement of the pump between maximum and minimum displacement control positions, resilient means biasing said member toward its maximum displacement control position, fluid pressure means operable in response to the fluid pressure supplied thereto to shift said member toward its minimum displacement control position in opposition to the resilient biasing means, passage means interconnecting said fluid pressure means to said outlet passage thereby causing said fluid pressure means to regulate the volumetric pumping capacity of said pump in accordance with the pressurized fluid supplied by said pump, and pressure surge accumulator means accommodating and damping pressure pulsations applied thereto, said surge accumulator means comprising a closed chamber having a passage connected to said pumping chamber intermediate the inlet and outlet passages for sequential connection to the pumping compartments in their passing intermediate said outlet and inlet passages, said surge accumulator means thereby being operable to minimize the displacement varying oscillatory movement of said member due to the pressure pulsations otherwise applied thereto by the sequential and alternate connection of the compartments to the outlet and their inlet passages.

4. A combined pumping mechanism comprising a casing having a plurality of chambers formed therein, a variable displacement rotary pump mounted in each of said pumping chambers, said pumps each including a rotor, a cylinder barrel mounted in each of said casing chambers and defining a pumping chamber therein movable to vary the pumping displacement of its respective pump, said casing and cylinder barrels defining an inlet passage and an outlet passage for each of said pumps, the rotor and barrel of each pump cooperating to define a plurality of variable displacement pumping compartments sequentially connectable to the inlet and outlet passages of their respective pumps, means for rotatably driving said rotors, a resilient means associated with and normally biasing each of said barrels in an increasing displacement direction, said casing and each of said cylinder barrels further defining a plurality of primary expansible chamber means therebetween, each of said primary expansible chamber means being operable in response to pressurized fluid supplied thereto to adjust the eccentricity of its associated cylinder barrel with respect to the axis of the rotor in opposition to said biasing means, first passage means interconnecting each of said primary expansible chamber means to the outlet passage of the same one of said pumps thereby rendering said primary expansible chamber means responsive to the discharge pressure of said same one pump to vary the relative pumping displacement of each of said pumps with respect to the other of said pumps in accordance with the pressurized fluid demand on said same one pump, and surge means for accommodating and damping pressure pulsations applied thereto, said surge means being connected to the pumping chamber of said same one pump intermediate its inlet and outlet passages and sequentially to the pumping compartments therein passing intermediate said outlet and inlet passages thereby minimizing the displacement varying oscillatory movement of the barrel of said pump due to the pressure pulsations otherwise applied thereto by the sequential connection of the several compartments to first the outlet passage and then to the inlet passage of said same one pump.

References Cited in the file of this patent

UNITED STATES PATENTS

| | | |
|---|---|---|
| 2,031,749 | Vincent | Feb. 25, 1936 |
| 2,080,810 | Douglas | May 18, 1937 |
| 2,373,360 | Walsh | Apr. 10, 1945 |
| 2,420,155 | Tucker | May 6, 1947 |
| 2,600,633 | French | June 17, 1952 |
| 2,612,144 | Ernst | Sept. 30, 1952 |
| 2,678,607 | Hufferd et al. | May 18, 1954 |
| 2,807,140 | Tyler | Sept. 24, 1957 |
| 2,855,857 | Chien-Bor Sung | Oct. 14, 1958 |
| 2,878,755 | O'Connor et al. | Mar. 24, 1959 |
| 2,894,458 | Hallman | July 14, 1959 |
| 2,929,329 | Wallace | Mar. 22, 1960 |